United States Patent
Songkakul et al.

(12)

(10) Patent No.: US 10,379,504 B2
(45) Date of Patent: *Aug. 13, 2019

(54) METHOD AND APPARATUS TO OPTIMIZE POWER TO MAXIMIZE PERFORMANCE OF MESH SENSORS AND CONTROL NETWORKS

(71) Applicant: Siemens Industry, Inc., Alpharetta, GA (US)

(72) Inventors: Pornsak Songkakul, Mequon, WI (US); Geoffrey Daniel Nass, Rolling Meadows, IL (US); Norman R. McFarland, Palatine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 495 days.

This patent is subject to a terminal disclaimer.

(21) Appl. No.: 14/678,635

(22) Filed: Apr. 3, 2015

(65) Prior Publication Data
US 2015/0212505 A1    Jul. 30, 2015

Related U.S. Application Data

(63) Continuation of application No. 12/032,409, filed on Feb. 15, 2008, now Pat. No. 9,024,717.
(Continued)

(51) Int. Cl.
*G05B 15/02* (2006.01)
*H04L 12/28* (2006.01)
(Continued)

(52) U.S. Cl.
CPC .......... *G05B 15/02* (2013.01); *H04L 12/2803* (2013.01); *H04L 12/2838* (2013.01);
(Continued)

(58) Field of Classification Search
None
See application file for complete search history.

(56) References Cited

U.S. PATENT DOCUMENTS

| 6,615,052 B1 * | 9/2003 | Parmenter | H04B 7/18543 455/13.4 |
| 6,677,864 B2 * | 1/2004 | Khayrallah | H04L 1/0009 341/50 |

(Continued)

OTHER PUBLICATIONS

Ramanathan et al., "Topology Control of Multihop Wireless Netowrks using Transmit Power Adjustment", 2000, IEEE Infocom, pp. 404-413.*

*Primary Examiner* — Jason Lin

(57) ABSTRACT

An automation component configured for optimized wireless communication within a building automation system is disclosed. The automation component includes a wireless communications component, a processor in communication with the wireless communications component, a memory in communication with the processor, the memory configured to store computer readable instructions which are executable by the processor. The computer readable instructions being programmed to process at least one communication variable received via the wireless communications component; to optimize a communication or radio transmit power level associated with the wireless communication component, wherein the optimized communication power level is a function of the at least one communication variable; and an adjustment of the communication power level associated with the wireless communication component based on the optimized communication power level.

20 Claims, 8 Drawing Sheets

Related U.S. Application Data

(60) Provisional application No. 60/901,998, filed on Feb. 16, 2007, provisional application No. 60/906,003, filed on Mar. 8, 2007.

(51) Int. Cl.
*H04W 52/18* (2009.01)
*H04W 4/80* (2018.01)
*H04W 52/24* (2009.01)
*H04W 52/26* (2009.01)
*H04W 52/28* (2009.01)
*H04W 52/48* (2009.01)
*H04W 84/22* (2009.01)

(52) U.S. Cl.
CPC ............ *H04W 4/80* (2018.02); *H04W 52/18* (2013.01); *H04L 2012/285* (2013.01); *H04L 2012/2841* (2013.01); *H04W 52/245* (2013.01); *H04W 52/246* (2013.01); *H04W 52/247* (2013.01); *H04W 52/265* (2013.01); *H04W 52/267* (2013.01); *H04W 52/283* (2013.01); *H04W 52/48* (2013.01); *H04W 84/22* (2013.01)

(56) References Cited

U.S. PATENT DOCUMENTS

| | | | | |
|---|---|---|---|---|
| 6,735,448 | B1* | 5/2004 | Krishnamurthy | H04W 52/343 370/318 |
| 7,106,703 | B1* | 9/2006 | Belcea | H04W 40/08 370/310 |
| 2003/0184433 | A1* | 10/2003 | Zalitzky | H04B 3/54 370/448 |
| 2005/0054362 | A1* | 3/2005 | Panpaliya | H04W 52/143 455/522 |
| 2006/0028997 | A1* | 2/2006 | McFarland | H04L 12/2803 370/252 |
| 2008/0080553 | A1* | 4/2008 | Hasty | H04L 1/0002 370/468 |
| 2009/0061774 | A1* | 3/2009 | Larsson | H04L 1/0006 455/41.2 |

* cited by examiner

METHOD AND APPARATUS TO OPTIMIZE POWER TO MAXIMIZE PERFORMANCE OF MESH SENSORS AND CONTROL NETWORKS

CROSS-REFERENCE TO RELATED APPLICATIONS

This patent application is a continuation of U.S. patent application Ser. No. 12/032,409, filed on Feb. 15, 2008, which claims the priority benefit under 35 U.S.C. § 119(e) of U.S. provisional patent application Ser. No. 60/901,998 (2007P03525US), filed on Feb. 16, 2007; and U.S. provisional patent application Ser. No. 60/906,003 (2007P05063US), filed on Mar. 8, 2007, the contents of which are hereby incorporated by reference for all purposes.

This patent relates to co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

BACKGROUND

The present disclosure generally relates to wireless device radio transmit power optimization within a building automation system. In particular, the present disclosure relates to methods and apparatuses for optimizing wireless device radio transmit power between automation components within a building automation system to maximize performance.

A building automations system (BAS) typically integrates and controls elements and services within a structure such as the heating, ventilation and air conditioning (HVAC) system, security services, fire systems and the like. The integrated and controlled systems are arranged and organized into one or more field level networks (FLNs) containing application or process specific controllers, sensors, actuators, or other devices distributed or wired to form a network. The field level networks provide general control for a particular floor or region of the structure. For example, a field level network may be an RS-485 compatible network that includes one or more controllers or application specific controllers configured to control the elements or services within floor or region. The controllers may, in turn, be configured to receive an input from a sensor or other device such as, for example, a room temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given field level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included field level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a field level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Each of the wireless devices or automation components utilized within the building automation system includes a radio transmitter which may be configured in order to optimize communications with the different elements, components and networks that comprise the building automation system. For example, the radio transmit power levels of one or more wireless devices or automation components may be adjusted in order to optimize communications between other wireless devices and automation components within the building automation system. It would be desirable to optimize communications and radio transmit power levels between various wireless devices or automation components within the building automation system.

SUMMARY

The present disclosure generally provides for adjusting and optimizing communications between wireless devices and/or automation components operating within a building automation system (BAS). Wireless devices and/or automation components may be configured to automatically provide or otherwise push communications from one device to another upon detection of a change-of-value or change in the state of a sensed or monitored value, component and/or indicator.

In one exemplary embodiment, an automation component configured for optimized wireless communication within a building automation system is disclosed. The automation component includes a wireless communications component, a processor in communication with the wireless communications component, a memory in communication with the processor, the memory configured to store computer readable instructions which are executable by the processor. The computer readable instructions being programmed to process at least one communication variable received via the wireless communications component; optimize a communication power level such as the radio transmit power associated with the wireless communication component, wherein the optimized communication power level is a function of the at least one communication variable; and adjust the communication power level associated with the wireless communication component based on the optimized communication power level.

In another exemplary embodiment, a building automation system configured for optimized wireless communication is disclosed. The building automation system includes a first automation component having a first wireless communication component. The first automation component configured to process at least one communication variable, and optimize a communication power level such as a radio transmit power level, wherein the optimized communication power level is a function of the at least one communication variable. The building automation system further includes a second automation component having a second wireless communication component, the second wireless communication component in communication with the first wireless communication. The second automation component is configured to adjust the communication power level associated with the second wireless communication component based on the optimized communication power level.

In another exemplary embodiment, a method for optimizing a wireless communication within a building automation system is disclosed. The method includes storing at least one communication variable in a memory such that the memory and the at least on communication variable are in communication with a processor, processing at least one communication variables received via a wireless communications component, optimizing a communication power level such as a radio transmit power level associated with the wireless communication component, wherein the optimized communication power level is a function of the at least one communication variable, and adjusting the communication power level associated with the wireless communication component based on the optimized communication power level.

Additional features and advantages of the present invention are described in, and will be apparent from, the following Detailed Description and the figures.

BRIEF DESCRIPTION OF THE FIGURES

The method, system and teaching provided relate to optimize communications between automation components operating within a building automation system (BAS).

DETAILED DESCRIPTION

Figure 1:
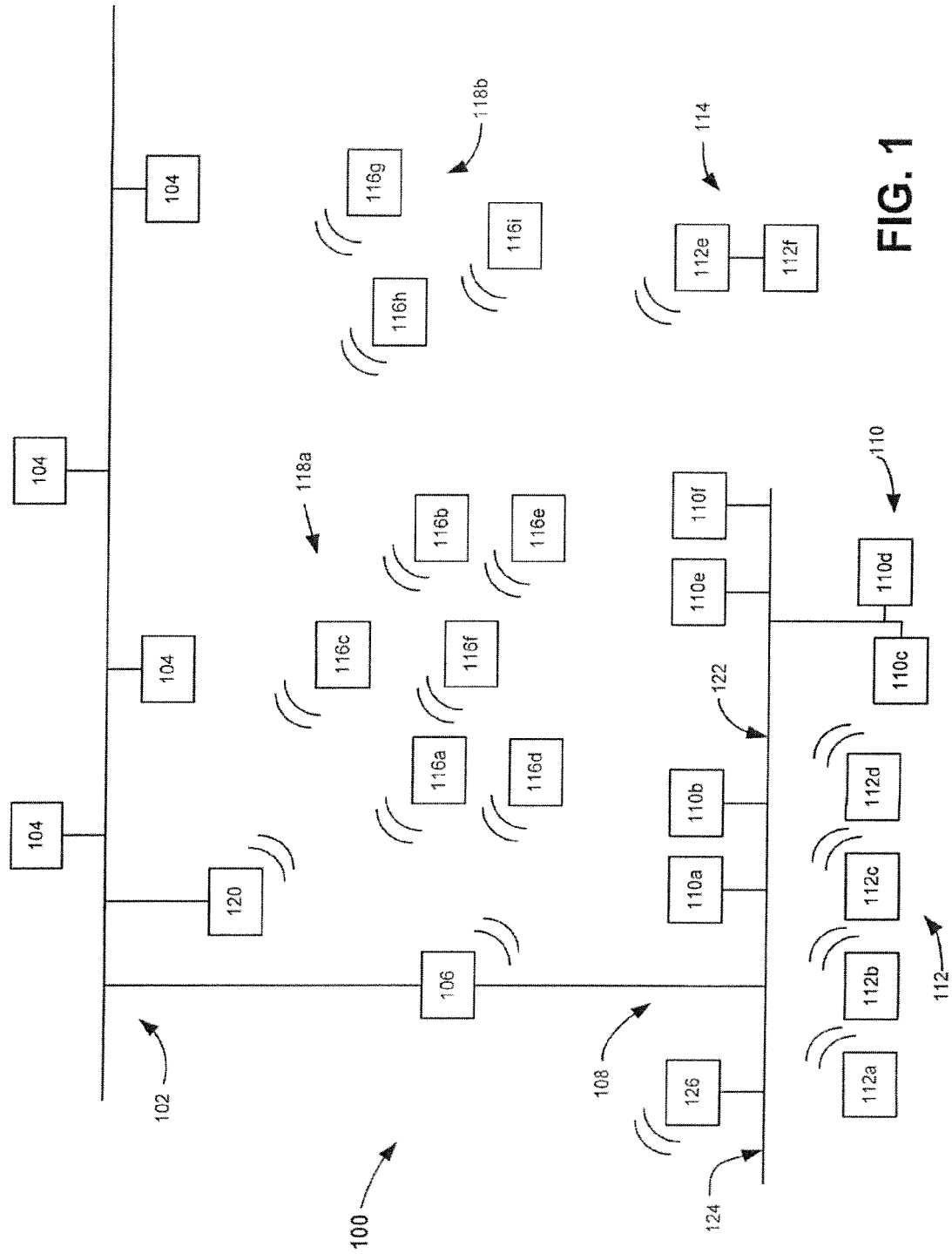
FIG. 1 illustrates an embodiment of a building automation system configured in accordance with the disclosure provided herein.

The embodiments discussed herein include automation components, wireless communication components and/or transceivers. The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein. Moreover, the disclosed building automation system describes automation components that may include separate wireless communication components and transceivers, however it will be understood that the wireless communication component and transceiver may be integrated into a single automation component operable within the building automation system.

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ11 or other type of connector, an RJ45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) or any other communication protocol. These exemplary wired, wireless devices may further include a man-machine interface (MMI) such as a web-based interface screen that provide access to configurable properties of the device and allow the user to establish or troubleshoot communications between other devices and elements of the BAS.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a field level network (FLN). The first network 102 may be wired or wirelessly coupled or in communication with the second network 108. The second network 108, in this exemplary embodiment, may include a first wired network portion 122 and a second wired network portion 124 that connect to building automation components 110 (individually identified as automation components 110a to 110f). The second wired network portion 124 may be coupled to wireless building automation components 112 via the automation component 126. For example, the building automation components 112 may include wireless devices individually identified as automation components 112a to 112f. In one embodiment, the automation component 112f may be a wired device that may or may not include wireless functionality and connects to the automation component 112e. In this configuration, the automation component 112f may utilize or share the wireless functionality provided by the automation component 112e to define an interconnected wireless node 114. The automation components 112a to 112f may, in turn, communicate or connect to the first network 102 via, for example, the controller 106 and/or an automation component 126. The automation component 126 may be a field panel, FPX or another full function device in communication with the second wired network portion 124 which, in turn, may be in communication with the first network 102.

The control system 100 may further include automation components 116 which may be individually identified by the reference numerals 116a to 116i. The automation components 116a to 116i may be configured or arranged to establish one or more networks or subnets 118a and 118b. The automation components 116a to 116i such as, for example, full or reduced function devices and/or a configurable terminal equipment controller (TEC), cooperate to wirelessly communicate information between the first network 102, the control system 100 and other devices within the mesh networks or subnets 118a and 118b. For example, the automation component 116a may communicate with other automation components 116b to 116f within the mesh network 118a by sending a message addressed to the network identifier, alias and/or media access control (MAC) address assigned to each of the interconnected automation components 116a to 116f and/or to a field panel 120. In one configuration, the individual automation components 116a to 116f within the subnet 118a may communicate directly with the field panel 120 or, alternatively, the individual automation components 116a to 116f may be configured in a hierarchal manner such that only one of the components for example, automation component 116c, communicates with the field panel 120. The automation components 116g to 116i of the mesh network 118b may, in turn, communicate with the individual automation components 116a to 116f of the mesh network 118a or the field panel 120.

The automation components 112e and 112f defining the wireless node 114 may wirelessly communicate with the second network 108, and the automation components 116g to 116i of the mesh network 118b to facilitate communications between different elements, section and networks within the control system 100. Wireless communication between individual the automation components 112, 116 and/or the subnets 118a, 118b may be conducted in a direct or point-to-point manner, or in an indirect or routed manner through the nodes or devices comprising the nodes or networks 102, 108, 114 and 118. In an alternate embodiment, the first wired network portion 122 is not provided, and further wireless connections may be utilized.

Figure 2:
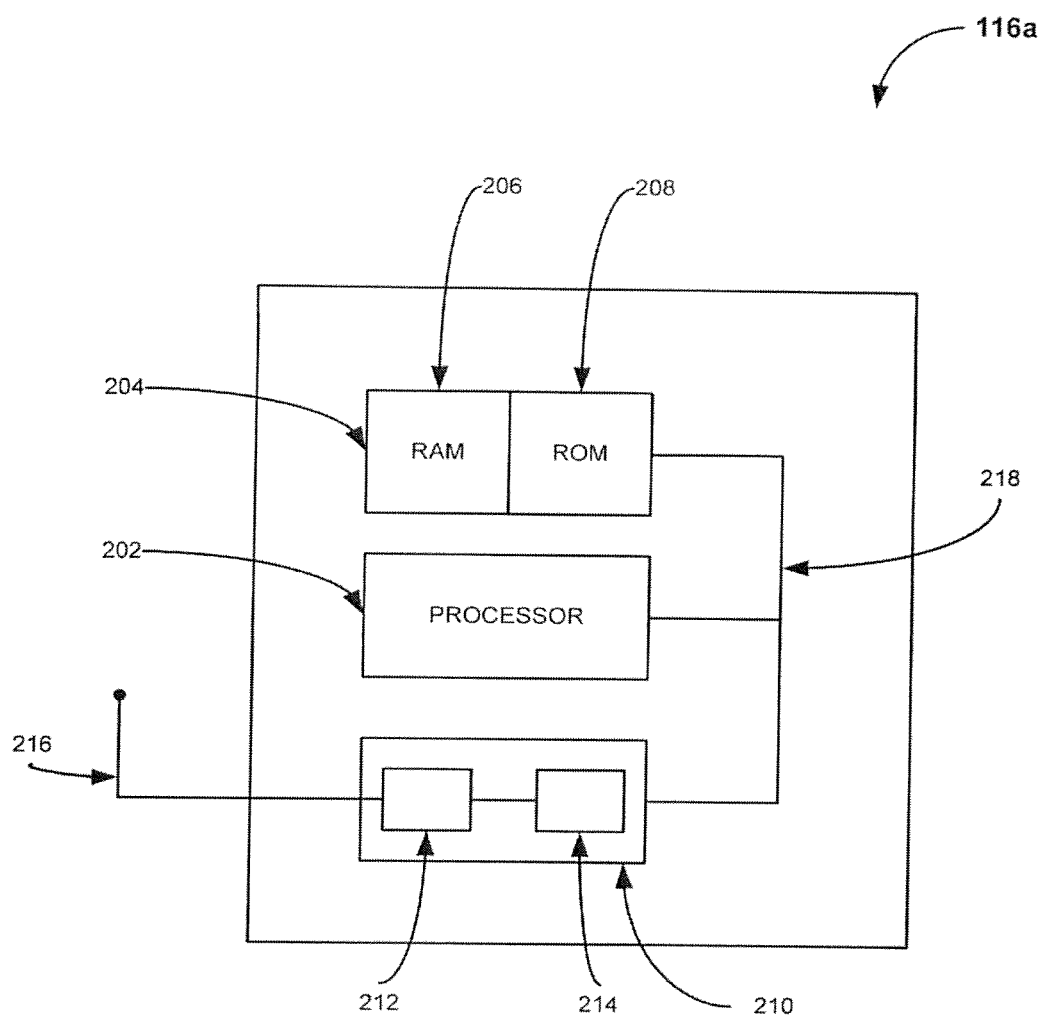
FIG. 2 illustrates an embodiment of a wireless device or automation component that may be utilized in connection with the building automation system shown in FIG. 1.

FIG. 2 illustrates an exemplary detailed view of one automation component 116a to 116i. In particular, FIG. 2 illustrates the automation component 116a. The automation component 116a may be a full function device or a reduced function device. While the automation component 116a is illustrated and discussed herein, the configuration, layout and componentry may be utilized in connection with any of the automation components deployed within the control system 100 shown and discussed in connection with FIG. 1. The automation component 116a in this exemplary embodiment may include a processor 202 such as an INTEL® PENTIUM, an AMD® ATHLON™ or other 8, 12, 16, 24, 32 or 64 bit classes of processors in communication with a memory 204 or storage medium. The memory 204 or storage medium may contain random access memory (RAM) 206, flashable or non-flashable read only memory (ROM) 208 and/or a hard disk drive (not shown), or any other known or contemplated storage device or mechanism. The automation component may further include a communication component 210. The communication component 210 may include, for example, the ports, hardware and software necessary to implement wired communications with the control system 100. The communication component 210 may alternatively, or in addition to, contain a wireless transmitter 212 and a receiver 214 (or an integrated transceiver) communicatively coupled to an antenna 216 or other broadcast hardware.

The sub-components 202, 204 and 210 of the exemplary automation component 116a may be coupled and configured to share information with each other via a communications bus 218. In this way, computer readable instructions or code such as software or firmware may be stored on the memory 204. The processor 202 may read and execute the computer readable instructions or code via the communications bus 218. The resulting commands, requests and queries may be provided to the communication component 210 for transmission via the transmitter 212 and the antenna 216 to other automation components 110, 112 and 116 operating within the first and second networks 102 and 108. Sub-components 202 to 218 may be discrete components or may be integrated into one (1) or more integrated circuits, multi-chip modules, and or hybrids.

The exemplary automation component 116a may be, for example, a WRTS deployed or emplaced within the structure. In operation, the WRTS may monitor or detect the temperature within a region or area of the structure. A temperature signal or indication representative of the detected temperature may further be generated by the WRTS. In another embodiment, the automation component 116a may be, for example, an actuator coupled to a sensor or other automation component. In operation, the actuator may receive a signal or indication from another automation component 116b to 116i and adjust the position of a mechanical component in accordance with the received signal. The signal or indication may be stored or saved within the memory 204 for later processing or communication to another component within the control system 100.

Figure 3:
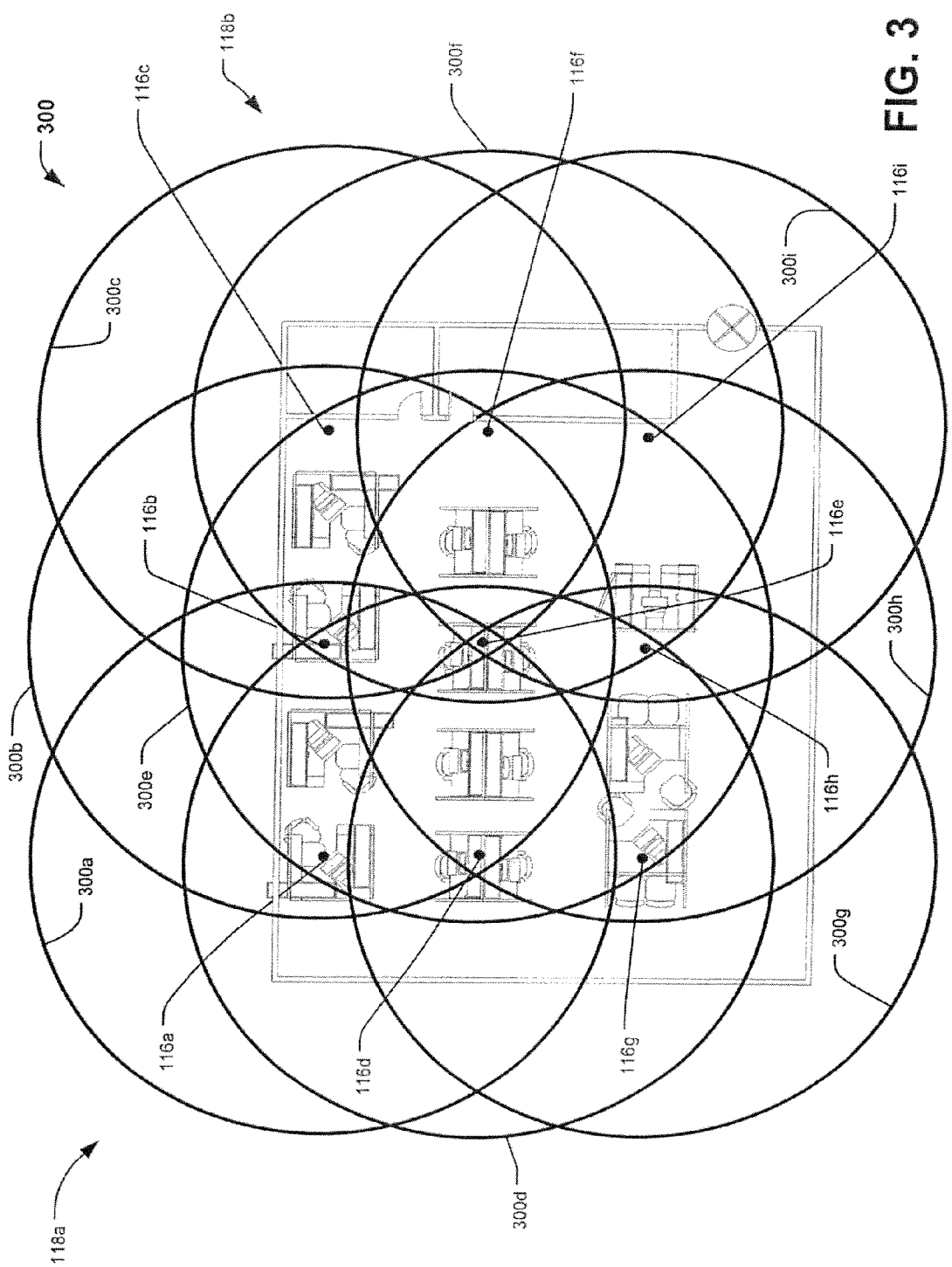
FIG. 3 illustrates an exemplary physical layout for a field level network including one or more automation components and/or subnets.

FIG. 3 illustrates an exemplary physical configuration 300 of automation components 116a to 116i that may be implemented in the control system 100. For example, the configuration 300 may be a wireless FLN that include the first and second subnets 118a, 118b. The exemplary configuration 300 illustrates a "noisy cocktail party" scenario where each of the communication components 210 within the automation components 116a to 116i is broadcasting at the same, fixed level such as, for example, the maximum power level, a factory default power level, etc. Each of the automation components 116a to 116i and the associated communication component 210 may define a broadcast range or zone 300a to 300i Each broadcast range 300a to 300i may include one or more sensors, actuators, other automation components, etc. which all cooperate to define a node of interconnected, communicating elements.

The noisy cocktail party scenario depicted in FIG. 3 represents a situation where the automation components 116a to 116i and the overlapping broadcast ranges 300a to 300i may disrupt or decrease the communication reliability within the FLN. In particular, because each of the automation components 116a to 116i and the overlapping broadcast ranges 300a to 300i communicate at the same power level and on the same communication channel, the communications therebetween are unreliable.

Figure 4:
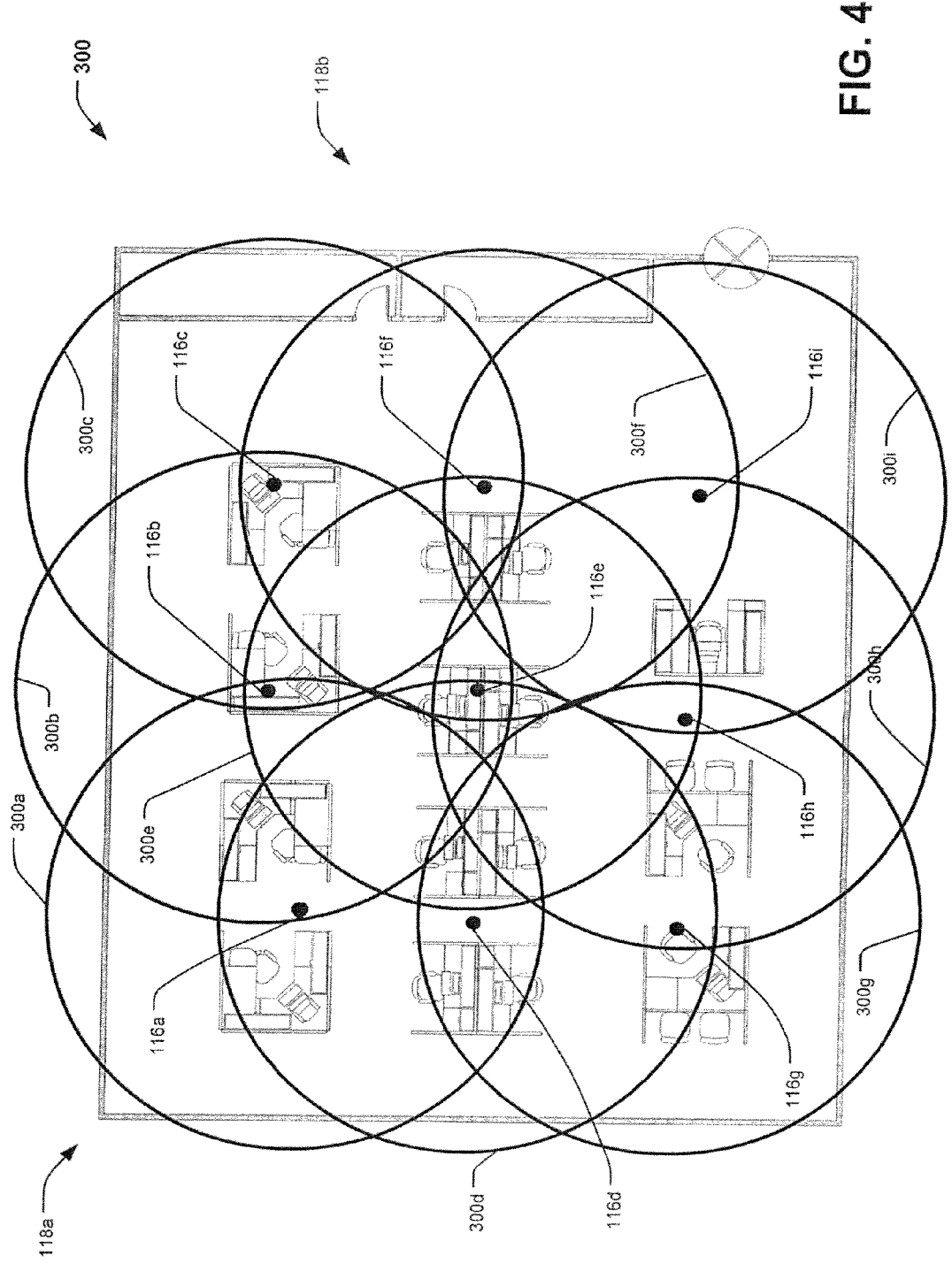
FIG. 4 illustrates another exemplary physical layout for a field level network including one or more automation components and/or subnets wherein the radio transmit powers are optimized.

FIG. 4 illustrates an embodiment of the physical configuration 300 wherein the power levels associated with one or more of the broadcast ranges 300a to 300i corresponding to one or more of the automation components 116a to 116i has been adjusted to optimize communications therebetween. The depicted configuration 300 allows for increased throughput between the components, subnets, nodes, etc., by adjusting the individual communication or radio transmit power levels to optimize one or more of the broadcast ranges 300a to 300i while reducing communications interference and increasing reliability.

Figure 5:
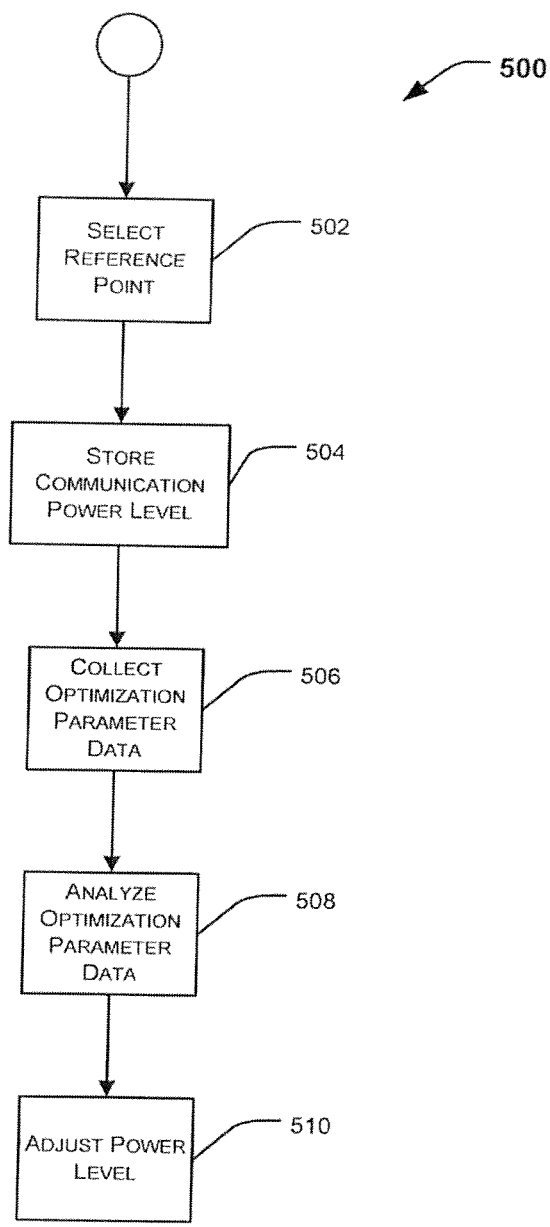
FIG. 5 illustrates an exemplary flowchart representative of a communications algorithm.

FIG. 5 illustrates an overview of an optimization routine 500 that may be utilized to optimize and configure the communication between the automation components 116a to 116i deployed in the physical configuration 300. The automation components 116a to 116i or nodes deployed in physical configuration 300 may employ a mesh network for wireless communication, i.e., the mesh network will automatically route a message from a source node to a destination node through one or more intervening nodes, that act as routing and repeater devices. The optimization routine 500 may adjust the individual radio transmit power levels of the automation components 116a to 116i to minimize interference and create the "happy cocktail party" scenario shown in FIG. 4.

At block 502, reference automation component(s) and/or node(s) may be identified. Identification may be a manually process initiated by a user, or may be an automatic process initiated and controlled by the control system 100. A single automation component or node within the FLN may be identified, multiple automation components or node within a single FLN may be identified and/or multiple automation components or nodes within multiple FLNs may be identified. A reference automation component, for example, the automation component 116a, may be selected as one of the initial or starting points for optimizing the communications within the FLN represented by the physical configuration 300.

At block 504, the communication or radio transmit power level of the wireless communication component 210 within the reference automation component identified or selected in block 502 may be collect, noted and stored in the memory 204.

At block 506, data or values associated with one or more predefined or preselected communication variables or optimization parameters may be detected and stored within the memory 204. The disclosed optimization parameters and/or routines provide for adjusting and changing an automation component or node's radio transmit power to a lower level that avoids over-communication with one or more other automation components or nodes, and/or to a higher level that avoids communication errors due to interference. This is analogous to voice communication, where it is best to talk in a conversational tone, and not to shout or whisper unnecessarily. The optimization parameters may include;

Number of neighboring automation components within one (1) hop—where possible optimizations include adjusting the automation component or node's radio transmit power so there are at least three (3) neighbors within one (1) hop to ensure good wireless communication, but no more than five (5) neighbors to avoid the "noisy cocktail party" over-communication case;

Number of automation components stored within routing tables—where possible optimizations include adjusting the automation component or node's radio transmit power so that there are at least three (3) "next-hop" nodes in the routing table, i.e., there are at least three (3) paths from the source node to any destination node;

Number of hops for other automation components to reach the reference automation component or node—where possible optimizations include adjusting the node's radio transmit power level so that the number of hops to reach the reference automation component or node is in the range of one (1) to five (5) hops;

Number of hops to reach the controller—where possible optimizations include adjusting the automation component or node's radio transmit power level so that the number of hops to reach the controller is in the range of one (1) to five (5) hops;

Link Quality Index (LQI)—LQI is a measurement of the quality of the wireless communication link between two nodes, including both RSSI values at both nodes, and message completion percentage at both nodes;

Received Signal Strength Indication (RSSI): RSSI is a measurement of the power level received at the wireless communication component—where possible optimizations include adjusting the automation component or node's radio transmit power level so that the RSSI value is within a specified range, e.g., not too low for reliable wireless communication, and not too high to avoid over-communication with too many other wireless nodes;

Average round trip time between the reference automation component and another automation component or element within the node—where possible optimizations include adjusting the automation component or node's radio transmit power level so that the RSSI value is within a specified range—not too low for reliable wireless communication, and not too high to avoid over-communication with too many other wireless nodes;

Number of retries to complete a message or communication between the reference automation component and another automation component—where possible optimizations include adjusting the node's radio transmit power level so that the number of retries is below a specified value—not too many retries because of a radio power level that is too low, so external RF interference can cause additional retries during wireless communication;

Percentage of messages or communication completed in a communication session—where possible optimizations include adjusting the node's radio transmit power level so that the completion percentage is above a specified value—a radio power level that is too low will allow external RF interference to disrupt wireless communication;

Type of automation component—where possible optimizations include adjusting or compensating for whether the components are full function devices (FFD), reduced function devices (RFD); alternation current (AC) or line powered devices; and/or battery powered devices;

Number of automation components parents for end devices—where possible optimizations include adjusting the automation component or node's radio transmit power level so that the completion percentage is above a specified value—a radio power level that is too low will allow external RF interference to disrupt wireless communication.

At block 508, the data or values associated with the communication variables or optimization parameters may be analyzed. For example, two or more of the optimization parameters and/or communication variables may be identified for optimization and the configuration. The identified parameters may represent factors which have been determined to be relevant to the performance of the reference automation component 116a.

At block 510, the power level of the wireless communication component 210 associated with the automation component 116a can be adjusted to reflect the analyzed values determined in block 508. In this way, communications between the automation component 116a and the sensors, actuators and other wireless devices operating within the node can be optimized to increase data throughput, reliability, and/or performance. Stated another way, the optimization of the automation components or nodes adjusts the communication or radio transmit power level of each automation component or node in the wireless mesh network so that it is not too high (over communication) or too low (weak communication).

Figure 6:
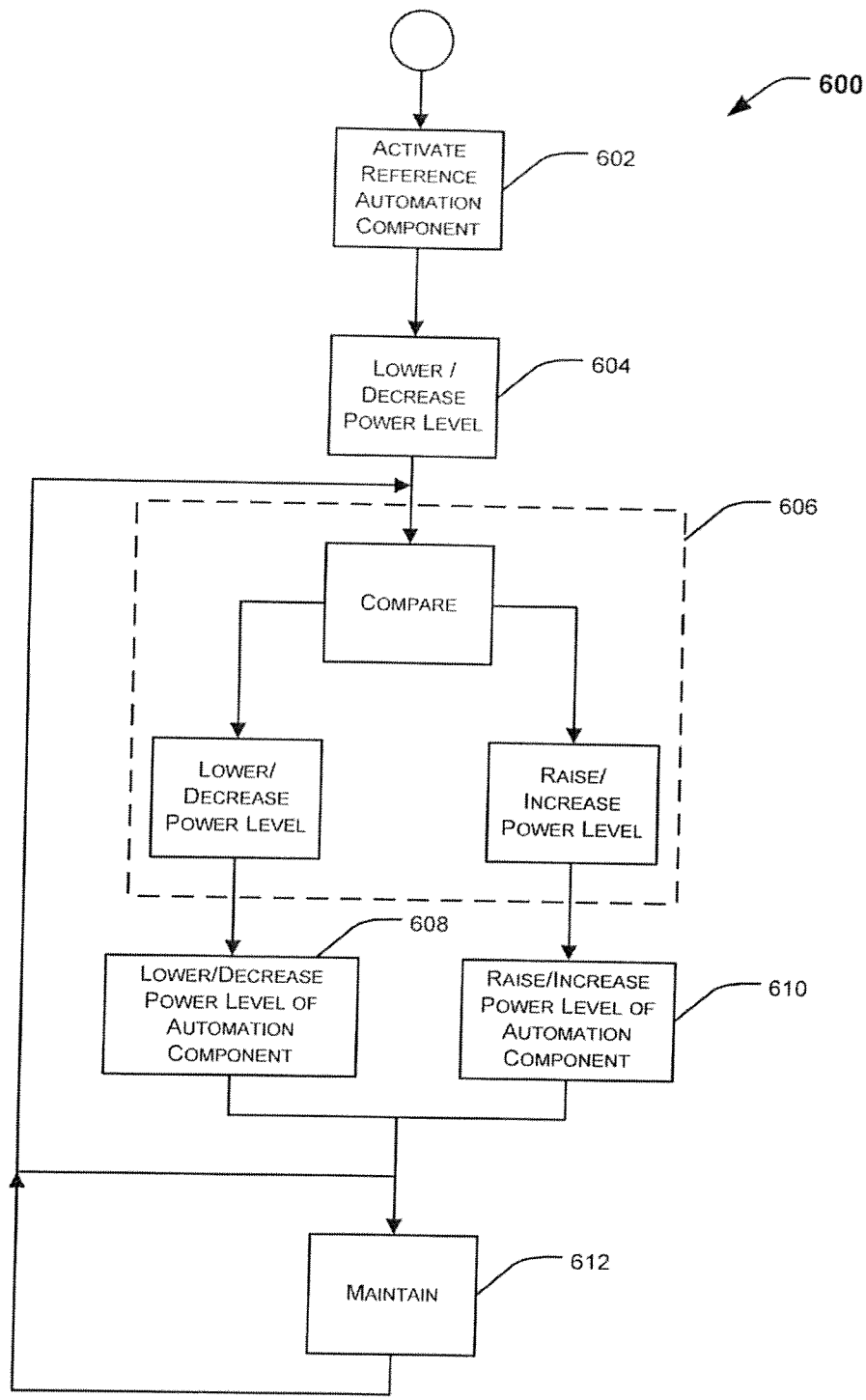
FIG. 6 illustrates another exemplary flowchart representative a communications algorithm.

FIG. 6 illustrates a detailed overview of another optimization routine 600 that may be utilized to optimize and configure the communication between the automation components 116a to 116i deployed in the physical configuration 300.

At block 602, one or more of the automation components 116a to 116i may be activated. The automation components 116a to 116i may be activated individually, at random locations, in a predefined pattern or in any physical or temporal interval. The automation components 116 may be activated at a default or first power level (maximum power is an often utilized default). The field panel 120 or any other full function device may communicate or provide a command to the activated automation components 116 to collect values for one or more of the communication variables and/or optimization parameters (discussed above).

At block 604, the power levels of the activated automation components 116 may be lowered to a second power level. The field panel 120 or any other full function device may again communicate or provide a command to the activated automation components 116 to collect values for one or more of the optimization parameters.

At block 606, the collected values at the default or first power level may be compared to the collected values at the second power level for each of the activated automation components 116. If the difference between the compared values satisfies a defined threshold level which may be, for example, a specified range for optimized wireless mesh network communication, for one of the automation components 116, then the automation component 116 flagged or noted to have the power level lowered to a second power level when next activated. If the difference between the compared values does not satisfy a defined threshold level for one of the automation components 116, then the automation component 116 flagged or noted to have the power level increased to a third power level when next activated and note that the power level cannot be lowered further. Generally, optimization adjusts and/or lowers the radio transmit power level of all of the wireless automation components or nodes in order to ensure that the user selected parameter(s) (such as number of 1-hop neighbors, RSSI, etc.) are within their optimized ranges. It is similar to the case of people at a cocktail party adjusting their voice levels so that conversations are heard only within the little group of people conversing at the party, and not by everyone at the party.

At block 608, one or more of the automation components 116a to 116i may be activated, if the automation component is flagged or noted for a lowered power level, the power level of the communication component 210 may be lowered by a predetermined or calculated value or amount. The field panel 120 or any other full function device may again communicate or provide a command to the activated automation components 116 to collect values for one or more of the optimization parameters.

At block 610, one or more of the automation components 116a to 116i may be activated, if the automation component is flagged or noted for an increased power level, the power level of the communication component 210 may be raised by a predetermined or calculated value or amount. The field panel 120 or any other full function device may again communicate or provide a command to the activated automation components 116 to collect values for one or more of the optimization parameters.

At block 612, if the automation component has been flagged or noted to maintain a power level, the power level of the communication component 210 may maintained at the current level while values are collected for one or more of the optimization parameters.

Regardless of the change in power level implemented at any one of the automation components 116a to 116i, the collected values of the one or more optimization parameters and/or communication variables may be compared at block 606 to previously collected values for the one or more of the optimization parameters.

Figure 7:
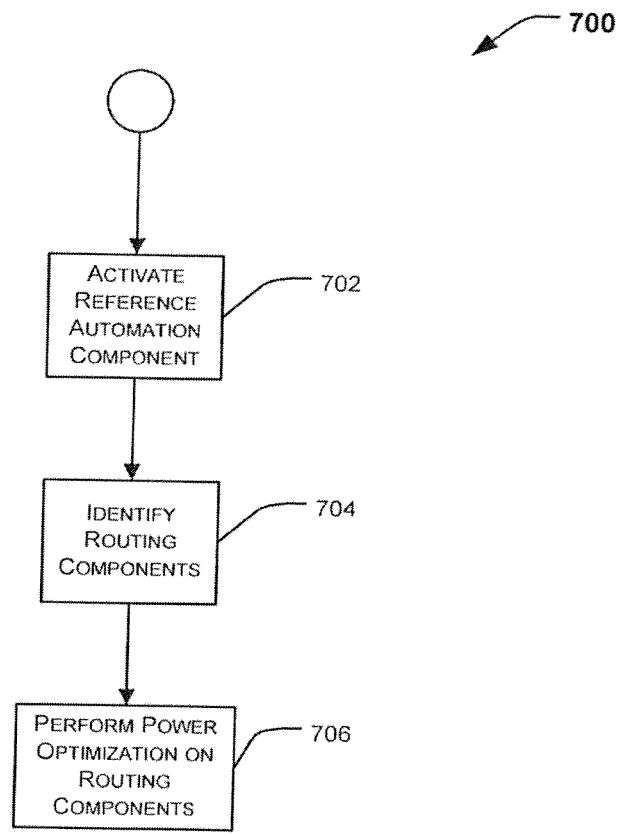
FIG. 7 illustrates another exemplary flowchart representative a communications algorithm.

FIG. 7 illustrates a detailed overview of another optimization routine 700 that may be utilized to optimize and configure the communication between the automation components 116a to 116i deployed in the physical configuration 300.

At block 702, one or more of the automation components 116a to 116i may be activated. The automation components 116a to 116i may be activated individually, at random locations, in a predefined pattern or in any physical or temporal interval. The automation components 116 may be activated at a default or first power level (maximum power is an often utilized default). The field panel 120 or any other full function device may communicate or provide a command to the activated automation components 116 to collect values for one or more of the optimization parameters.

At block 704, common routing information for bound automation components 116, sensors, actuators and other devices within a node or group may be identified. The common routing information may be identifying the automation components 116 or devices within the FLN that handle, direct or otherwise control the routing or communications between the other automation components 116 or nodes.

At block 706, the power optimization routine 600 may be implemented on the identified automation components 116.

Figure 8:
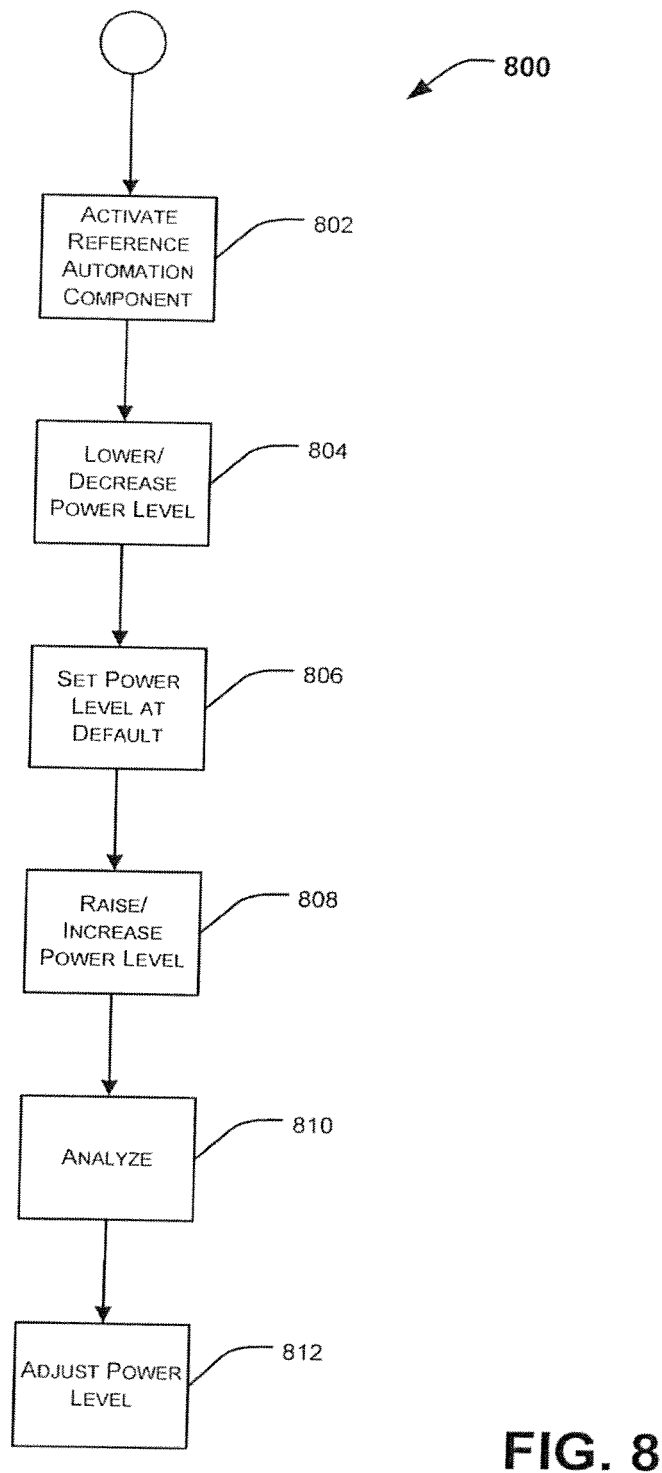
FIG. 8 illustrates another exemplary flowchart representative a communications algorithm.

FIG. 8 illustrates a detailed overview of another optimization routine 800 that may be utilized to optimize and configure the communication between the automation components 116a to 116i deployed in the physical configuration 300.

At block 802, one or more of the automation components 116a to 116i may be activated. The automation components 116a to 116i may be activated individually, at random locations, in a predefined pattern or in any physical or temporal interval. The automation components 116 may be activated at a default or first power level (maximum power is an often utilized default). The field panel 120 or any other full function device may communicate or provide a command to the activated automation components 116 to collect values for one or more of the optimization parameters.

At block 804, the power levels of the activated automation components 116 may be lowered. The field panel 120 or any other full function device may again communicate or provide a command to the activated automation components 116 to collect values for one or more of the optimization parameters. This process may be repeated until the power level of each of the automation components 116a to 116i within the FLN has been decreased and the values for one or more of the optimization parameters have been collected.

At block 806, the power levels of the each of the activated automation components 116 may be returned to the default power level.

At block 808, the power levels of the activated automation components 116 may be raised. The field panel 120 or any other full function device may again communicate or provide a command to the activated automation components 116 to collect values for one or more of the communication variables and/or optimization parameters. This process may be repeated until the power level of each of the automation components 116a to 116i within the FLN has been increased and the values for one or more of the optimization parameters have been collected.

At block 810, the collected values for one or more of the optimization parameters may be analyzed and optimized to determine a power level for each of the automation components 116a to 116i.

At block 812, the power level for each of the automation components 116a to 116i may be altered to the power level determined in the analysis and optimization process.

In one exemplary embodiment, the optimization routines and processes discussed herein may be implemented by the individual automation components 110, 112, and 116. Alternatively, in another exemplary embodiment, the optimization routines and processes may be executed remotely by, for example, one of the terminals 104, the controller 106 or any other automation component in communication with the control system 100. For example, a personal digital assistant (PDA), laptop or other portable computing device may be configured to execute the optimization routines and processes. The PDA and/or laptop may be connected wired or wirelessly connected to the automation component 110, 112 and/or 116 to be optimized.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. An automation component configured for optimized wireless communication within a building automation system, the automation component comprising:
   a wireless communications component;
   a processor in communication with the wireless communications component;
   a memory in communication with the processor, the memory configured to store computer readable instructions which are executable by the processor;
   wherein the computer readable instructions are programmed to:
      process optimization parameter data received via the wireless communications component, wherein the optimization parameter data includes a number of wireless communication components stored in a routing table in communication with the memory, the number of wireless communication components stored in the routing table including a number of next-hop wireless communication components relative to the wireless communications component;
      optimize a communication power level associated with the wireless communication component based on the received optimization parameter data; and
      adjust the communication power level associated with the wireless communication component based on the optimized communication power level.

2. The automation component of claim 1, wherein the optimization parameter data further includes a communications response time, an average round trip communications time, a number of communication retries, a type of wireless components, a number of communication retries to complete a communication between the wireless communications component and the one other wireless communications component, a type of wireless component, a proximity to other wireless communication components, a link quality index between the wireless communications component and one of the other wireless communications components, the link quality index comprising a received signal strength indication (RSSI) and a communication completion rate, or any combination thereof.

3. The automation component of claim 1, wherein the wireless communication component is a transceiver.

4. The automation component of claim 1, wherein the optimization parameter data further includes a number of hops for a second automation component to reach the present automation component, a number of hops to a controller operable within the building automation system, a number of child automation components, or any combination thereof.

5. The automation component of claim 1, wherein the wireless communication component is configured to communicate the optimized communication power level associated with the wireless communication component to a second wireless communication component.

6. The automation component of claim 1, wherein the wireless communication component is configured to communicate a second optimized communication power level associated with a second wireless communication component and the optimization parameter data to the second wireless communication component.

7. The automation component of claim 1, wherein memory is configured to store a plurality of values for the optimization parameter data, and
wherein the processor is configured to compare the plurality of values as a function of time.

8. A building automation system configured for optimized wireless communication, the building automation system comprising:
a first automation component having a first wireless communication component, the first automation component configured to:
process at least one optimization parameter, wherein the at least one optimization parameter includes a number of wireless communication components stored in a routing table, the number of wireless communication components stored in the routing table including a number of next-hop wireless communication components relative to the first wireless communication component;
optimize a communication power level, wherein the optimized communication power level is a function of the at least one optimization parameter; and
a second automation component having a second wireless communication component, the second wireless communication component in communication with the first wireless communication,
wherein the second automation component is configured to: adjust the communication power level associated with the second wireless communication component based on the optimized communication power level.

9. The building automation system of claim 8, wherein the at least one optimization parameter further includes a communications response time, an average round trip communications time, a number of communication retries, a type of wireless components, a number of communication retries to complete a communication between the wireless communications component and the one other wireless communications component, a type of wireless component, a proximity to other wireless communication components, a link quality index between the wireless communications component and one of the other wireless communications components, the link quality index comprising a received signal strength indication (RSSI) and a communication completion rate, or any combination thereof.

10. The automation component of claim 8, wherein the first and second wireless communication components are transceivers.

11. The automation component of claim 8, wherein the at least one optimization parameter further includes number of hops for a second automation component to reach the present automation component, number of hops to a controller operable within the building automation system, number of child automation components, or any combination thereof.

12. The automation component of claim 8, wherein the first wireless communication component is configured to communicate a second optimized communication power level associated with the second wireless communication component and the at least one communication variable to the second wireless communication component.

13. The automation component of claim 8, further comprising:
a memory that is configured to store a plurality of values for the at least one optimization parameter; and
a processor that is configured to compare the plurality of values for the at least one optimization parameter as a function of time.

14. A method for optimizing a wireless communication within a building automation system, the method comprising:
storing a value of at least one optimization parameter in a memory, wherein the memory and the at least one optimization parameter are in communication with a processor;
processing the stored value of the at least one optimization parameter, wherein the at least one optimization parameter relates to a number of wireless communication components stored in a routing table in communication with the memory, the number of wireless communication components stored in the routing table including a number of next-hop wireless communication components relative to a wireless communication component in communication with the processor;
optimizing a communication power level associated with the wireless communication component, wherein the optimized communication power level is a function of the at least one optimization parameter; and
adjusting the communication power level associated with the wireless communication component based on the optimized communication power level.

15. The method of claim 14, wherein the at least one optimization parameter further relates to a communications response time, an average round trip communications time, a number of communication retries, a type of wireless components, a number of communication retries to complete a communication between the wireless communications component and the one other wireless communications component, a type of wireless component, a proximity to other wireless communication components, a link quality index between the wireless communications component and one of the other wireless communications components, the link quality index comprising a received signal strength indication (RSSI) and a communication completion rate, or any combination thereof.

16. The method of claim 14, further comprising detecting a value of the communication completion rate.

17. The method of claim 14, wherein processing at least one optimization parameter received via a wireless communications component includes receiving the at least one optimization parameter via a transceiver.

18. The method of claim 14, wherein the at least one optimization parameter is further related to number of hops for a second automation component to reach the present automation component, number of hops to a controller operable within the building automation system, number of child automation components, or any combination thereof.

19. The method of claim 14, further comprising:
communicating the optimized communication power level associated with the wireless communication component to a second wireless communication component.

20. The method of claim 14, wherein storing the value of the at least one optimization parameter includes storing a plurality of values for the at least one optimization parameter and wherein the processor is configured to compare the plurality of values for the at least one optimization parameter as a function of time.

\* \* \* \* \*